United States Patent
Momen et al.

(10) Patent No.: US 12,037,996 B2
(45) Date of Patent: Jul. 16, 2024

(54) FUEL DRIVEN NEAR ISOTHERMAL COMPRESSOR

(71) Applicant: UT-BATTELLE, LLC, Oak Ridge, TN (US)

(72) Inventors: Ayyoub Mehdizadeh Momen, Knoxville, TN (US); Ahmed Abuheiba, Knoxville, TN (US); Saiid Kassaee, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 536 days.

(21) Appl. No.: 17/396,968

(22) Filed: Aug. 9, 2021

(65) Prior Publication Data
US 2022/0099342 A1    Mar. 31, 2022

Related U.S. Application Data

(60) Provisional application No. 63/084,742, filed on Sep. 29, 2020.

(51) Int. Cl.
*F04B 41/02* (2006.01)
*F04B 23/02* (2006.01)
(Continued)

(52) U.S. Cl.
CPC .............. *F04B 41/02* (2013.01); *F04B 23/02* (2013.01); *F04B 23/08* (2013.01); *F04B 35/008* (2013.01);
(Continued)

(58) Field of Classification Search
CPC .......... F04B 41/02; F04B 23/02; F04B 23/08; F04B 35/008; F04B 39/0011; F04F 1/16; F25B 31/00; F25B 31/02
(Continued)

(56) References Cited

U.S. PATENT DOCUMENTS 1,240,967 A  *  9/1917  Griffith ..................... F04F 1/16
                                                      417/73
2,916,200 A  *  12/1959  Gerhard ................. F25B 31/00
                                                      417/381
(Continued)

FOREIGN PATENT DOCUMENTS

DE        3842856 A1  *  6/1990

OTHER PUBLICATIONS

Assessment of the Market for Compressed Air Efficiency Services, US Department of Energy, Jun. 2001 (https://www.energy.gov/sites/prod/files/2014/05/f16/newmarket5.pdf).
(Continued)

*Primary Examiner* — Charles G Freay
(74) *Attorney, Agent, or Firm* — FOX ROTHSCHILD LLP

(57) ABSTRACT

A gas compressor system includes a compression liquid holding tank in fluid communication with a combustion tank. A combustible fluid is directed to the combustion tank. An ignition system is provided for igniting the combustible fluid. A compression liquid flows between the liquid holding tank, the combustion tank, and a compression tank. A compressible gas is provided in the compression tank. The ignition of the combustible fluid drives the compression liquid from the combustion tank to the compression tank, compressing the compressible liquid. An HVAC&R system and a method of compressing gas are also disclosed.

17 Claims, 13 Drawing Sheets

(51) Int. Cl.
*F04B 23/08* (2006.01)
*F04B 35/00* (2006.01)
*F04B 39/00* (2006.01)
*F04F 1/16* (2006.01)
*F25B 31/02* (2006.01)
*F25B 31/00* (2006.01)

(52) U.S. Cl.
CPC ............ *F04B 39/0011* (2013.01); *F04F 1/16* (2013.01); *F25B 31/02* (2013.01); *F25B 31/00* (2013.01)

(58) Field of Classification Search
USPC .................................................. 417/74, 381
See application file for complete search history.

(56) References Cited

U.S. PATENT DOCUMENTS

| | | | | |
|---|---|---|---|---|
| 3,285,001 | A * | 11/1966 | Turnblade | F02G 1/00 417/208 |
| 6,033,192 | A | 3/2000 | Wood | |
| 6,739,131 | B1 * | 5/2004 | Kershaw | F01K 25/02 60/512 |
| 6,939,131 | B2 * | 9/2005 | Maumus | F27D 5/00 432/259 |
| 7,003,955 | B2 | 2/2006 | Davis | |
| 8,234,863 | B2 * | 8/2012 | McBride | F22B 27/16 60/512 |
| 8,240,509 | B2 | 8/2012 | Geiger | |
| 10,519,923 | B2 | 12/2019 | Momen et al. | |
| 2010/0205960 | A1 | 8/2010 | McBride | |
| 2011/0030361 | A1 | 2/2011 | Gopalswamy | |
| 2011/0115223 | A1 | 5/2011 | Stahlkopf | |
| 2011/0259001 | A1 | 10/2011 | McBride | |
| 2011/0283690 | A1 | 11/2011 | Bollinger | |
| 2012/0297772 | A1 | 11/2012 | McBride | |
| 2014/0013735 | A1 | 1/2014 | McBride | |
| 2015/0345802 | A1 | 12/2015 | Van Haaren | |
| 2015/0362124 | A1 | 12/2015 | Favy | |
| 2016/0348637 | A1 | 12/2016 | Bachli | |

OTHER PUBLICATIONS https://airsquared.com/scroll-technology/articles/scroll-compressor-and-scroll-vacuum-pump-efficiency-explained/; Oct. 6, 2015.
Hydrogen Station Compression, Storage, and Dispensing Technical Status and Costs, May 2014 (https://www.nrel.gov/docs/fy14osti/58564.pdf).
The Linde Group, Hydrogen Technologies, The Iconic Compressor 90 MPa-IC90, Apr. 2015 https://refman.energytransitionmodel.com/publications/2021/download.
Odukomaiya et al.: "Experimental and analytical evaluation of a hydro-pneumatic compressed-air Ground-level Integrated Diverse Energy Storage (GLIDES) system", Applied Energy, vol. 221, Jul. 2018, pp. 75-85.
Odukomaiya et al.: "Preliminary Performance Evaluation of a Ground-Level Integrated Diverse Energy Storage (GLIDES) Prototype System", Oak Ridge National Laboratory (ORNL), Oak Ridge, TN (United States). 2017.
Odukomaiya et al.: "Transient thermofluids analysis of a Ground-Level Integrated Diverse Energy Storage (GLIDES) system." ASME 2015 International Mechanical Engineering Congress and Exposition. American Society of Mechanical Engineers, 2015. doi:10.1115/IMECE2015-50478.
Odukomaiya et al.: "Thermal analysis of near-isothermal compressed gas energy storage system", Applied Energy, vol. 179, Oct. 1, 2016, pp. 948-960.
Odukomaiya et al.: "Near-isothermal-isobaric compressed gas energy storage",? Journal of Energy Storage, vol. 12, Aug. 2017, pp. 276-287.

* cited by examiner

FUEL DRIVEN NEAR ISOTHERMAL COMPRESSOR

CROSS-REFERENCE TO RELATED APPLICATIONS

This application claims priority to U.S. Provisional Patent Application No. 63/084,742 filed on Sep. 29, 2020, entitled "FUEL DRIVEN NEAR ISOTHERMAL COMPRESSOR", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates generally to gas compressors, and more particularly to gas compressors that are capable of near isothermal operation.

BACKGROUND OF THE INVENTION

Currently, gas compression is dominated by electrically driven motors and is a very energy-intensive process. The several energy conversion processes required from power plant to the compressor (fuel→shaft power→electricity→transmission/distribution→shaft power→compression) result in energy losses at each step, which compound into large losses and high primary-energy-use intensity. Furthermore, state-of-the-art compressors used in vapor compression cycles essentially undergo adiabatic compression, which is an energy-inefficient compression trajectory.

There is shown in U.S. Pat. No. 10,519,923 a near isothermal combined compressed gas pumped hydroelectricity storage. A pump directs a working liquid to pressurize a gas that is confined within a pressurized gas vessel. The pump can be powered by electricity provided by a renewable resource such as solar or wind, or by the grid during off-peak periods. The disclosure of this patent is hereby incorporated fully by reference.

SUMMARY OF THE INVENTION

A gas compressor system, comprising a a compression liquid holding tank, a combustion tank, and a compression tank. The combustion tank can have a compression liquid inlet in fluid communication with the compression liquid holding tank, a combustible fluid inlet for fluid communication with a combustible fluid source, an ignition system for igniting the combustible fluid, and a compression liquid flow opening. A compression liquid and a compressible gas are provided. A pump is provided for pumping the compression liquid from the compression liquid holding tank to the combustion tank.

The compression tank can have a compression liquid flow opening. The compression liquid flow opening of the compression tank can be in liquid communication with the compression liquid flow opening of the combustion tank.

A valve for controlling flow of the compression liquid between the compression liquid holding tank and the combustion tank can be provided. A valve for controlling fluid communication between the combustion tank and the compression tank can be provided. A valve for controlling the flow of combustible fluid with the combustion tank can also be provided.

The combustible fluid is flowed into the combustion tank and compressible gas is provided in the compression tank. The compression liquid is pumped by the pump from the compression liquid holding tank to the combustion tank, compressing the combustible fluid. The combustible fluid is ignited by the ignition system causing the compression liquid to flow from the combustion tank to the compression tank, compressing the compressible gas in the compression tank. The compressing of the compressible gas can be isothermal.

The compression tank can include at least one selected from the group consisting of a compressible gas inlet and a compressible gas outlet. The compression tank can include a valve for controlling the flow of the compressible gas. The compression tank can have a spray head for introducing compression liquid into the compression tank as a spray.

The combustible fluid can beany suitable combustible fluid. The combustible fluid can be at least one selected from the group consisting of natural gas, gasoline, and diesel fuel. The ignition system can be a suitable ignition system for the combustible fluid that is being used. For example, the ignition system can include a spark generator.

A hydraulic pressure intensifier can be provided. The hydraulic pressure intensifier can increase the pressure of the compression liquid flowing from the combustion tank to the compression tank.

The compressible gas can be selected from many possible compressible gases. The compressible gas can be, for example, at least one selected from the group consisting of air, hydrogen, $CO_2$, natural gas, hydrocarbon gases, and refrigerant gases.

A refrigeration or heat pump system according to the invention can include a gas compressor system according to the invention, and a condenser or gas cooler, an expansion device, and an evaporator. The compressible gas can be a suitable refrigerant.

A method for compressing a gas can include the steps of providing a compression liquid holding tank, a combustion tank and a compression tank. The combustion tank can have a compression liquid inlet in fluid communication with the compression liquid holding tank, a combustion gas inlet for communicating with a combustion gas source, and a compression liquid outlet. The compression tank can have a compression liquid flow opening. The compression liquid flow opening of the compression tank can be in liquid communication with the compression liquid flow opening of the combustion tank.

A compression liquid is provided in the compression liquid holding tank. A compressible gas is provided in the compression tank/. A combustible fluid is flowed into the combustion tank. The compression liquid is pumped from the compression liquid holding tank to the combustion tank, compressing the combustion gas;

The combustible fluid is combusted, causing the compression liquid to flow from the combustion tank to the compression tank, compressing the compressible gas in the compression tank. The compressed compressible gas upon changing of the valve causes the compression liquid to flow to the combustion tank to displace and remove combustion gases from the combustion tank. The compression of the compressible gas can be isothermal.

A gas compressor includes a compression liquid holding tank, a combustion tank and a compression tank. The combustion tank can have a compression liquid inlet in fluid communication with the compression liquid holding tank, a combustible fluid inlet for fluid communication with a combustible fluid source, an ignition system for igniting the combustible fluid, and a compression liquid flow opening. A compression liquid can be provided. A pump is provided for pumping the compression liquid from the compression liquid holding tank to the combustion tank. The compression tank can have a compression liquid flow opening, the compression liquid flow opening of the compression tank being in liquid communication with the compression liquid flow opening of the combustion tank. A valve can be provided for controlling fluid communication between the combustion tank and the compression tank. A valve can be provided for controlling the flow of combustible fluid with the combustion tank. The combustible fluid is flowed into the combustion tank and compressible gas is provided in the compression tank, the compression liquid is pumped by the pump from the compression liquid holding tank to the combustion tank, compressing the combustible fluid, and the combustible fluid is ignited by the ignition system causing the compression liquid to flow from the combustion tank to the compression tank, compressing the compressible gas in the compression tank. The gas compressor can further include a hydraulic pressure intensifier to increase the pressure of the compression liquid from the combustion tank to the compression tank.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
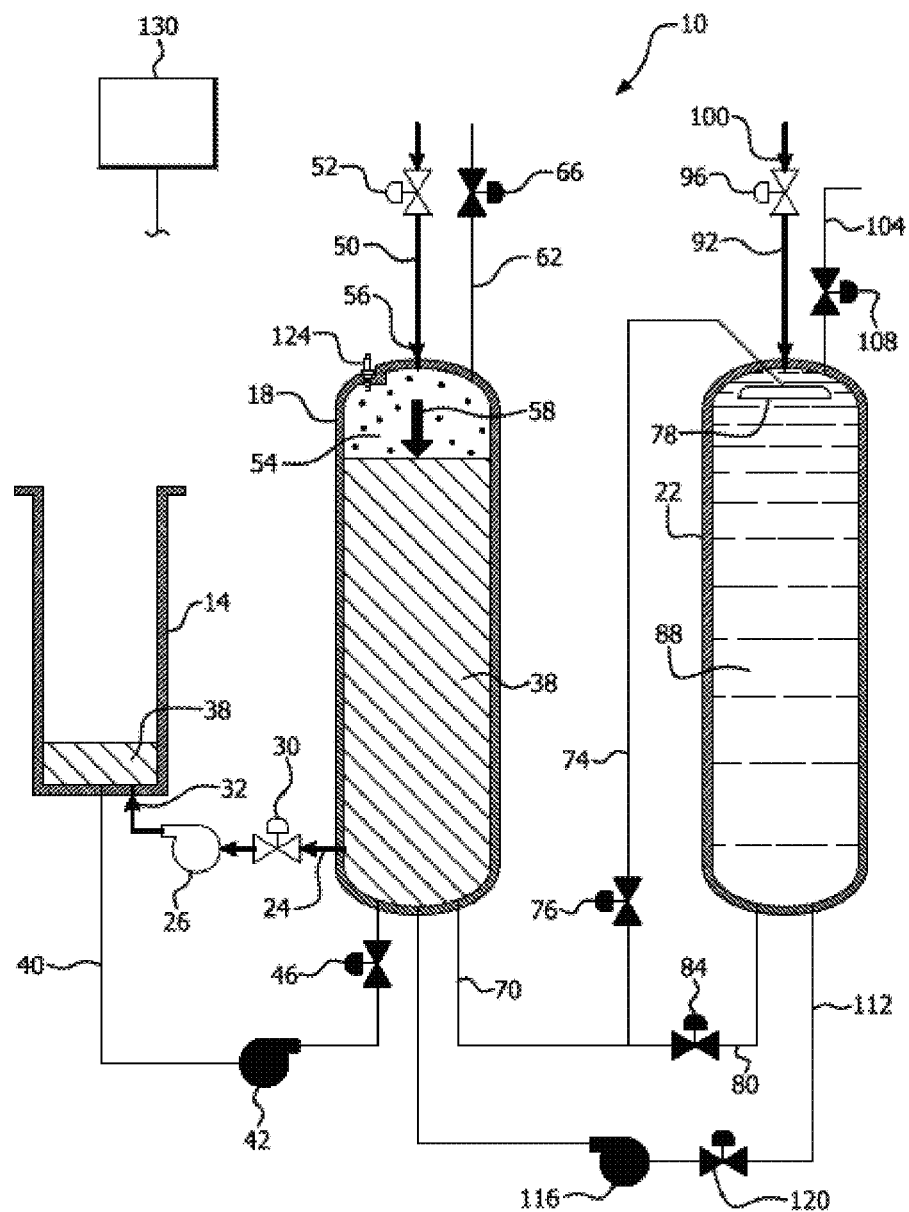
FIG. 1 is a schematic diagram of a gas compressor system according to the invention, in a first mode of operation.

A gas compressor system according to the invention includes a compression liquid holding tank, a combustion tank and a compression tank. The relative dimensions, design, and materials of these tanks can vary according to the design parameters of intended use of the gas compressor system.

The combustion tank includes a compression liquid inlet in fluid communication with the compression liquid holding tank. A combustible fluid inlet is provided for fluid communication between the combustion tank and a combustible fluid source.

Compression liquid flow openings with suitable connected conduits allows the flow of a compression liquid into and from the compression liquid holding tank, the combustion tank, and the compression tank. The compression liquid flows between the combustion tank and the liquid holding tank, and between the combustion tank and the compression tank. A pump can be provided for pumping the compression liquid from the compression liquid holding tank to the combustion tank.

The compression tank has a compression liquid flow opening to permit the inflow and/or outflow of compression liquid. A separate compression liquid inlet and compression liquid outlet are possible. The compression liquid flow opening of the compression tank is in liquid communication with the compression liquid flow opening of the combustion tank.

Valves can control the flow of the compression liquid between the combustion tank and compression liquid holding tank and the combustion tank. Valves controls the flow of compression liquid between the combustion tank and the compression tank. Valves can control the flow of combustible fluid and combustion products to and from the combustion tank. Valves can control the flow of compressible gas into and from the compression tank. The design of these valves can vary. The valves can be the same design or different designs.

Many different compression liquids are possible. Examples include water, oils, and hydraulic fluids. Other compression liquids are possible. The compression liquid should be substantially unreactive with the combustible fluid or combustion reaction products, and with the gas being compressed. The compression liquid should also be substantially stable at the desired operating conditions such as temperature and pressure of the gas compressor. The compression liquid should also be immiscible with the compressible gas.

A combustible fluid is provided. Many different combustible fluids are possible. The combustible fluid can include natural gas. Oxygen from a suitable gas source such as air can be added. The combustible fluid can comprise a liquid fuel sprayed and combined with oxygen prior to ignition, for example, gasoline or diesel fuel and oxygen gas.

A compressible gas is provided. The compressible gas constitutes the working fluid of the gas compressor system, and accordingly different compressible gases can be used for different purposes. The compressible gas in one embodiment can be a refrigerant for the refrigeration cycle of a heating, ventilation, air conditioning and refrigeration HVAC&R system. Many such synthetic and natural refrigerants are known, such as R32, R410A, R515B, R717 (ammonia), R290, and R744 ($CO_2$). Other compressible gases can be used, for example in energy storage applications. Examples of such gases are air, hydrogen, $CO_2$, ammonia and hydrocarbon gases. The invention can be used to compress natural gas to make compressed natural gas (CNG) and liquid natural gas (LNG).

In operation, the combustible fluid is flowed into the combustion tank and the compressible gas is provided in the compression tank. The compression liquid is pumped by the pump from the compression liquid holding tank to the combustion tank, compressing the combustible fluid. The combustible fluid is ignited by the ignition system causing the compression liquid to flow from the combustion tank to the compression tank, compressing the compressible gas in the compression tank.

The compression tank can include a spray head for introducing compression liquid into the compression tank as a spray. The spray assists in keeping the process near isothermal. The term isothermal as used herein means an isothermal compression efficiency of at least 95, 95.5, 96, 96.5, 97, 97.5, 98, 98.5, 99, 99.5 or 100%, or within a range of any high value and low value selected from these values. The droplets sizes of the spray can vary. The spray droplets remove some or most of the heat of compression from the compressible gas. The removal of some or most of the compression heat brings the pressure-volume trajectory of the compression process closer to the isothermal trajectory.

The gas compressor system can include a hydraulic pressure intensifier to increase the pressure of the compression liquid flowing from the combustion tank to the compression tank. Hydraulic pressure intensifiers take in a fluid at one pressure, and discharge the liquid at another, usually higher, pressure.

An ignition system is provided for igniting the combustible fluid. The ignition system can include a spark generator. Other ignition systems for igniting combustible fluids are possible, for example diesel-like ignition.

The design and sizing of the pumps that are used in the invention can vary. Pumps in some instance can be omitted where for example suitable head is available to drive the movement of the liquid is a desired fashion.

A refrigeration system includes a gas compressor system, a condenser or gas cooler, an expansion device, and an evaporator. The gas compressor system includes a compression liquid holding tank, a combustion tank, and a compression tank. The combustion tank includes a compression liquid inlet in fluid communication with the compression liquid holding tank, a combustible fluid inlet for fluid communication with a combustible fluid source, an ignition system for igniting the combustible fluid, and a compression liquid flow opening. A pump is provided for pumping the compression liquid from the compression liquid holding tank to the combustion tank. The compression tank has a compression liquid flow opening. The compression liquid flow opening of the compression tank is in liquid communication with the compression liquid flow opening of the combustion tank. A valve can be provided for controlling fluid communication between the combustion tank and the compression tank. A valve can be provided for controlling the flow of combustible fluid with the combustion tank. A combustible fluid is flowed into the combustion tank and a compressible gas is provided in the compression tank. The compression liquid is pumped by the pump from the compression liquid holding tank to the combustion tank, compressing the combustible fluid. The combustible fluid is ignited by the ignition system causing the compression liquid to flow from the combustion tank to the compression tank, compressing the compressible refrigerant gas in the compression tank. This compressed refrigerant gas can then be used as part of an HVAC&R system.

The HVAC&R system can be any suitable such system which requires compression of a refrigerant. Such systems typically include a condenser or gas cooler, an expansion device, and an evaporator. The invention can be used with a heat pump system.

A method for compressing a gas includes the steps of providing a compression liquid holding tank, and providing a combustion tank. The combustion tank includes a compression liquid inlet in fluid communication with the compression liquid holding tank, a combustion gas inlet for communicating with a combustion gas source, and a compression liquid outlet. A compression liquid is provided in the compression liquid holding tank. A compression tank is provided, and can include a compression liquid flow opening. The compression liquid flow opening of the compression tank being in liquid communication with the compression liquid flow opening of the combustion tank.

A compressible gas is provided in the compression tank. The combustible fluid is flowed into the combustion tank. The compression liquid is pumped from the compression liquid holding tank to the combustion tank, compressing the combustion gas. The combustible fluid is combusted causing the compression liquid to flow from the combustion tank to the compression tank, compressing the compressible gas in the compression tank. The compressed compressible gas upon changing of the valve causes the compression liquid to flow to the combustion tank to displace and remove combustion gases from the combustion tank. The compression of the compressible gas can be isothermal or near isothermal. The method can include the step of utilizing a hydraulic pressure intensifier to increase the pressure of the compression liquid from the combustion tank to the compression tank.

There is shown in FIGS. 1-9 a gas compressor system 10 according to the invention. The system includes a liquid holding tank 14, a combustion tank 18, and a compression tank 22. The liquid holding tank 14 can be in liquid communication with the combustion tank 18 by at least one liquid conduit 24 which communicates with compression liquid flow openings in the compression liquid holding tank 14 and the combustion tank 18. A pump 26 and valve 30 can be provided to pump compression liquid 38 from the combustion tank 18 to the liquid holding tank 14 as shown by arrows 32. The compression liquid 38 can be returned from the liquid holding tank 14 to the combustion tank 18 by a suitable conduit 40 communicating with a compression liquid flow opening at the compression liquid holding tank and the combustion tank 18. The conduit 40 can have an associated pump 42 and control valve 46 for controlling the flow of compression liquid through the conduit 40.

A combustible fluid can enter the combustion tank 18 through a suitable combusted gas inlet conduit 50. A valve 52 can be used to control the flow of combustible fluid 54 into the combustion tank 18 as shown by arrows 56 as the level of compression liquid 38 falls as shown by arrow 58. Gas combustion products can exit the combustion tank 18 through a suitable exhaust conduit 62 which can be controlled by a valve 66.

The compression liquid 38 can exit the combustion tank 18 through a compression liquid exit conduit 70 which communicates with compression liquid flow openings in the combustion tank 18 and the compression tank 22. Compression liquid 38 can flow from the conduit 70 and a spray head supply conduit 74 and control valve 76 to spray head 78. The compression liquid 38 can alternatively flow through a branch 80 and control valve 84 into the compression tank 22. An ignition system such as spark generator 124 is provided in the combustion tank 18.

A compressible gas 88 enters the compression tank 22 through a suitable conduit 92. Flow of the compressible gas 88 into the compression tank 22 is controlled through a suitable valve 96 and in the open condition the valve 96 permits flow of compressible gas into the compression tank 22 is indicated by arrows 100. The flow of compressible gas 88 out of the compression tank 22 can be through a conduit 104 and can be controlled by a valve 108.

The flow of compression liquid out of the compression tank 22 is through a suitable conduit 112 which communicates with compression liquid flow openings in the combustion tank 18 and the compression tank 22. The flow of compression liquid out of the compression tank 22 can be assisted by pump 116 and controlled by control valve 120.

A suitable processor 130 can be provided to control operation of the gas compressor assembly 10. The processor 130 can communicate with the valves, pumps and other process equipment such as temperature and pressure sensors. This communication can be through suitable wired or wireless connections.

Figure 2:
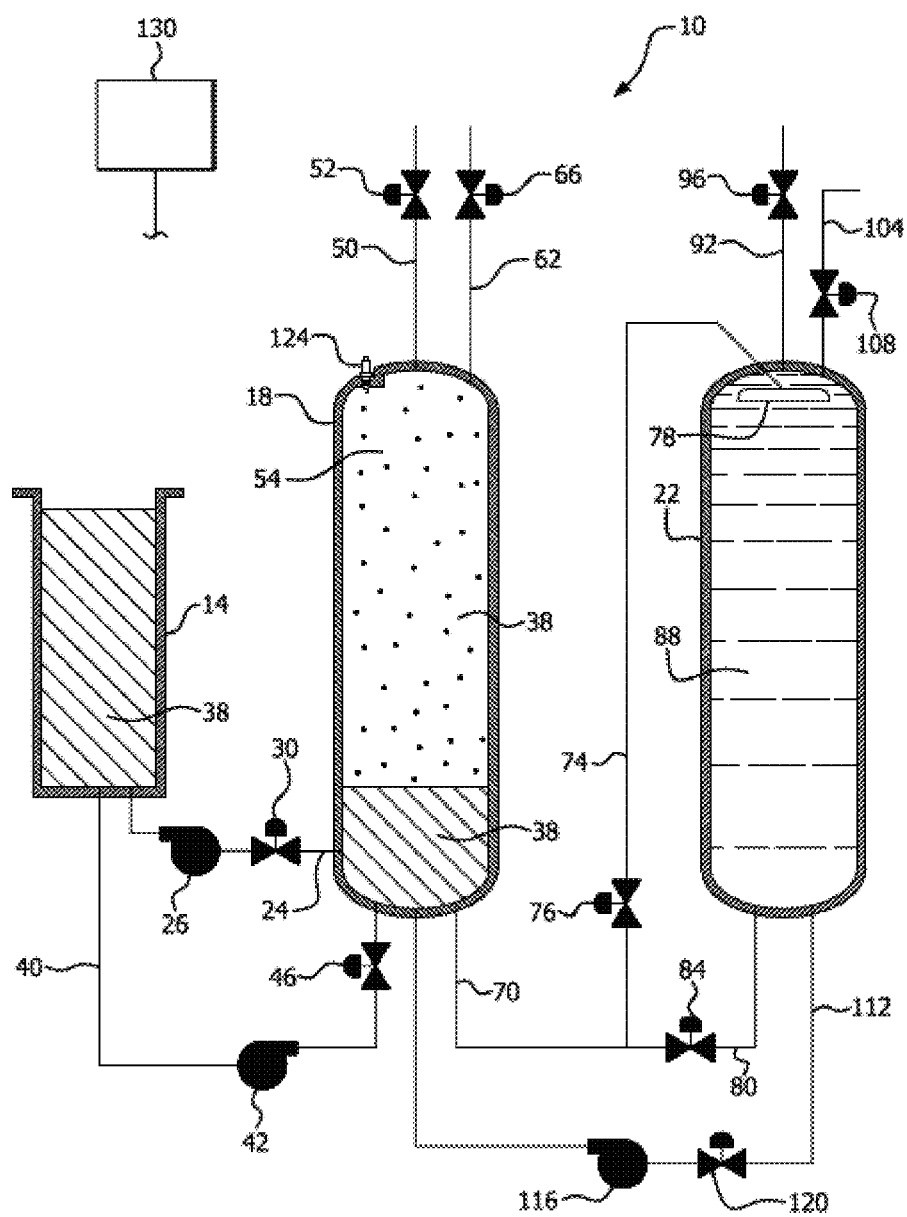
FIG. 2 is a schematic diagram of a gas compressor system according to the invention, in a second mode of operation.

As shown in FIG. 1, in an initial state compression liquid 38 is pumped by the pump 26 into the compression liquid holding tank 14 as indicated by arrow 32. The compression liquid level falls as indicated by arrow 58. The valve 52 is open and the exhaust conduit 62 is closed by the valve 66. The pump on and valve open are indicated by an unfilled outline, and the pump off and valve closed are indicated by a filled outline. A desired quantity of combustible fluid 54 thereby enters and fills the combustion tank 18. Compressible gas enters the compression tank 22 through open the valve 96 and conduit 92. As shown in FIG. 2, the valves 30, 52 and 96 are then closed.

Figure 3:
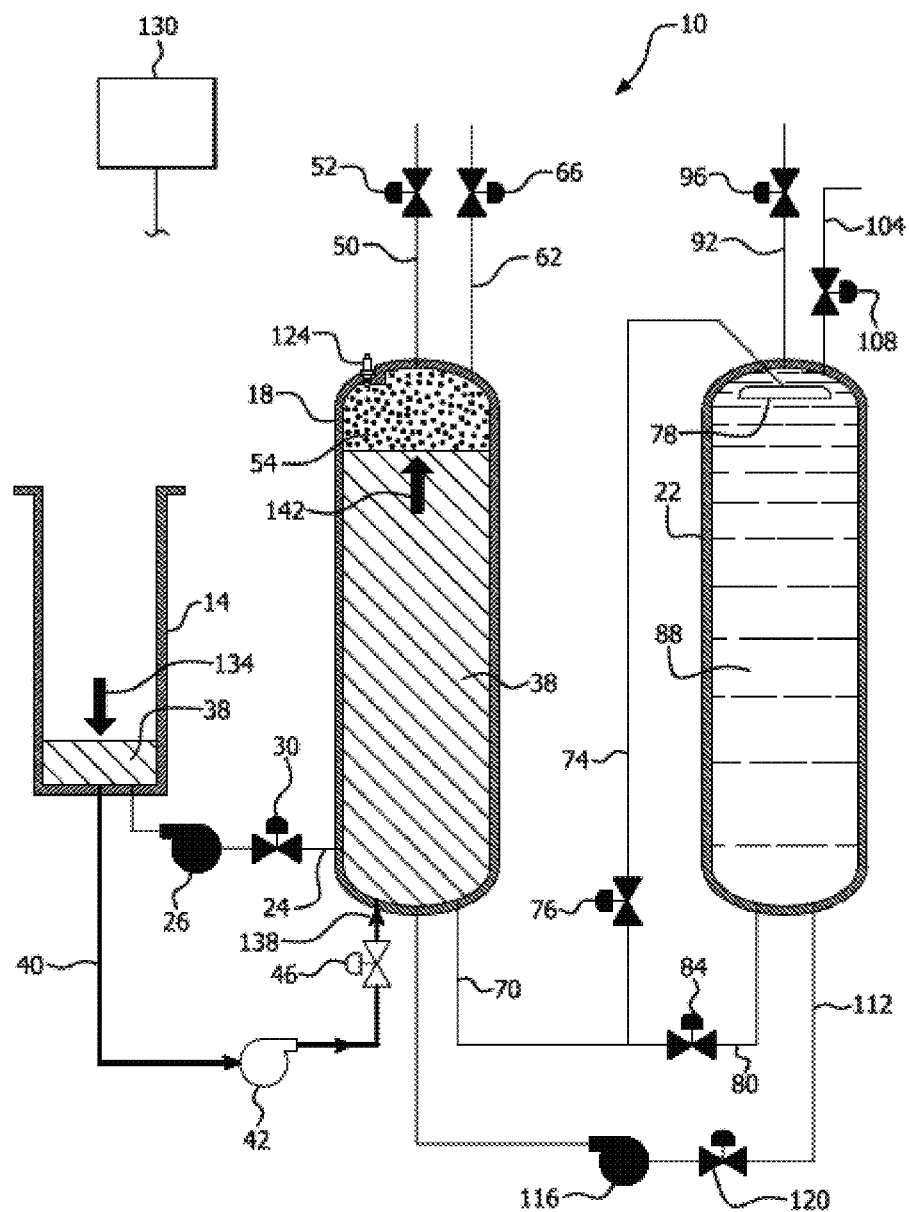
FIG. 3 is a schematic diagram of a gas compressor system according to the invention, in a third mode of operation.
Figure 4:
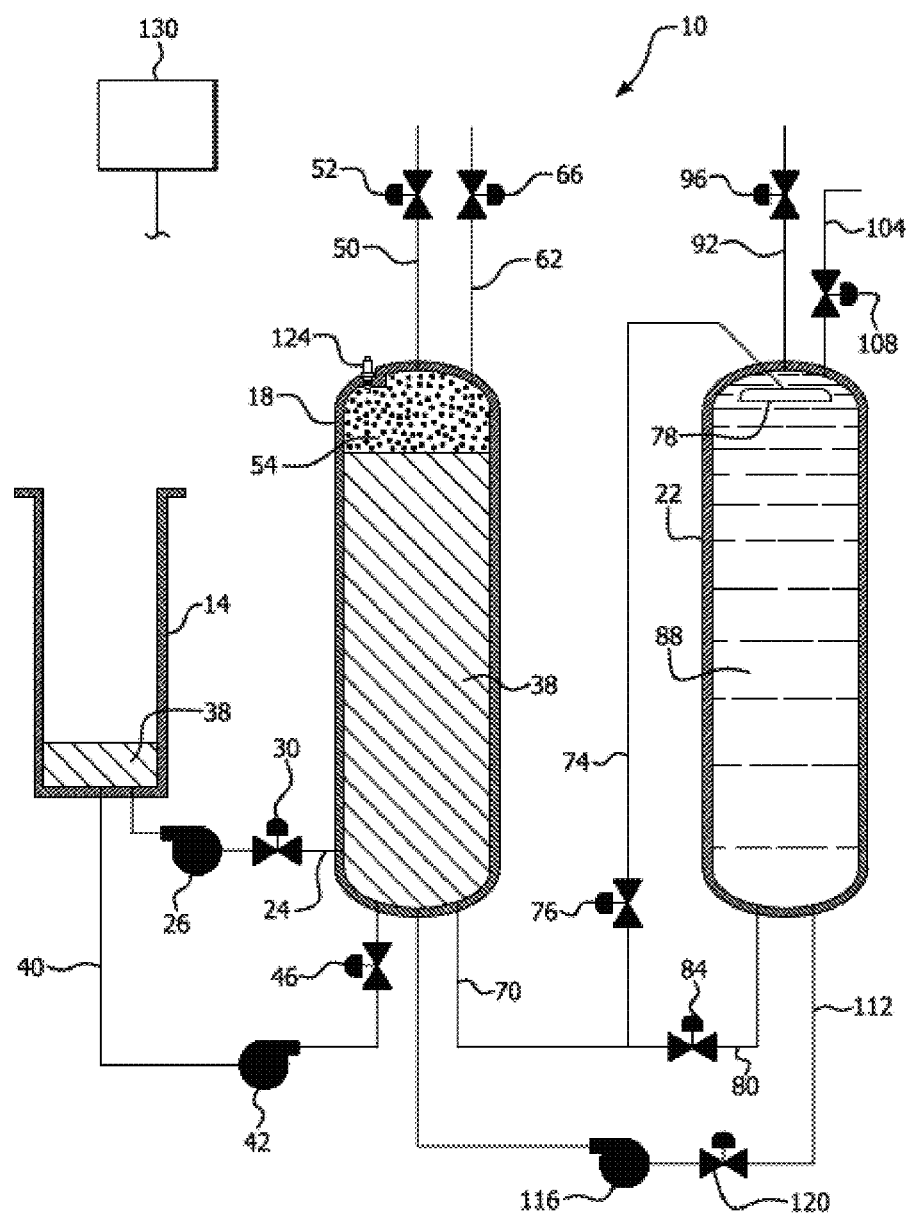
FIG. 4 is a schematic diagram of a gas compressor system according to the invention, in a fourth mode of operation.

As shown in FIG. 3, the valve 46 is then opened and the pump 42 operated to return compression liquid 38 to the combustion tank 18 and the compression liquid level in the compression liquid holding tank 14 falls as shown indicated by arrow 134, and compression liquid returns to the combustion tank 18 as shown by arrow 138. The level of the compression liquid 38 in the combustion tank 18 rises as indicated by arrow 142. This acts to compress the combustible fluids 54. The system is then charged and the valve 46 is closed as shown in FIG. 4.

Figure 5:
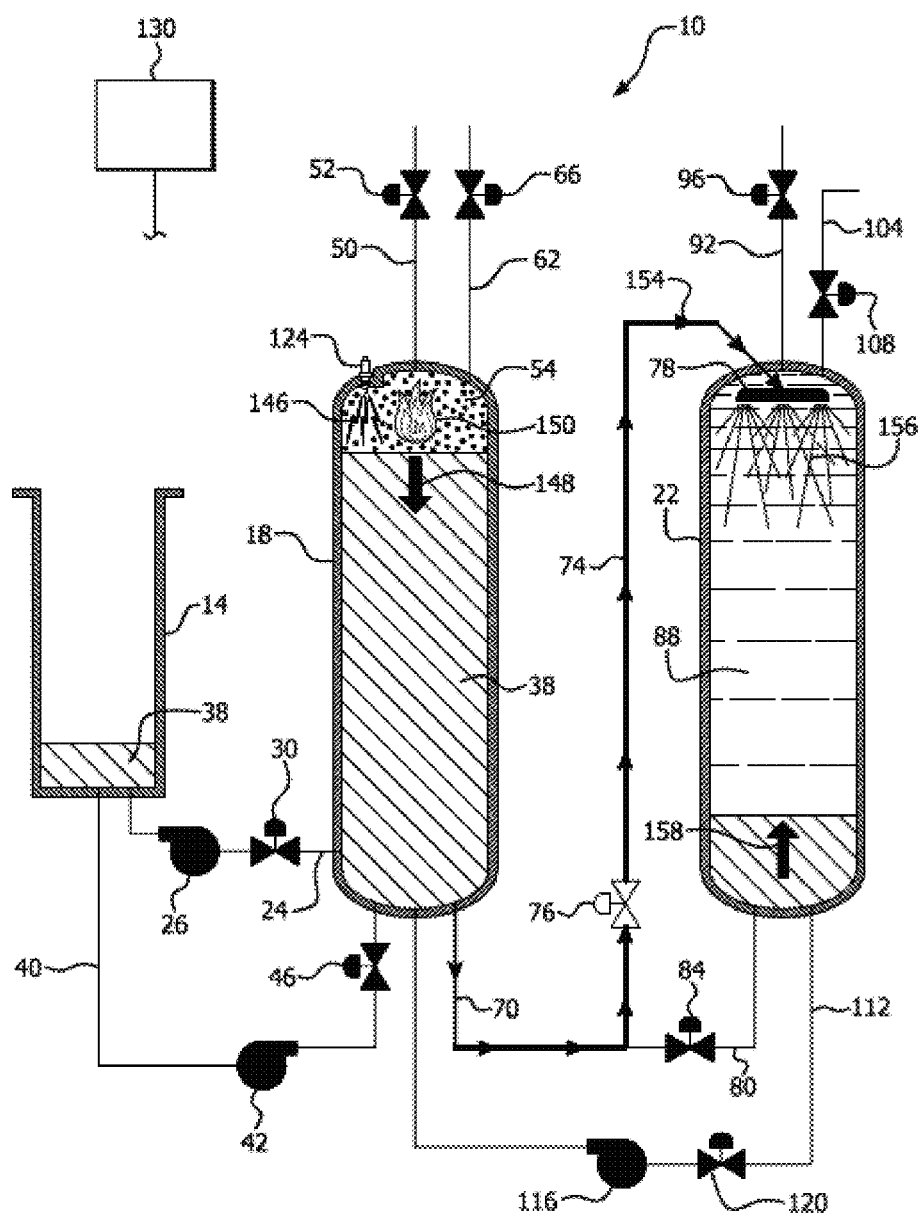
FIG. 5 is a schematic diagram of a gas compressor system according to the invention, in a fifth mode of operation.
Figure 6:
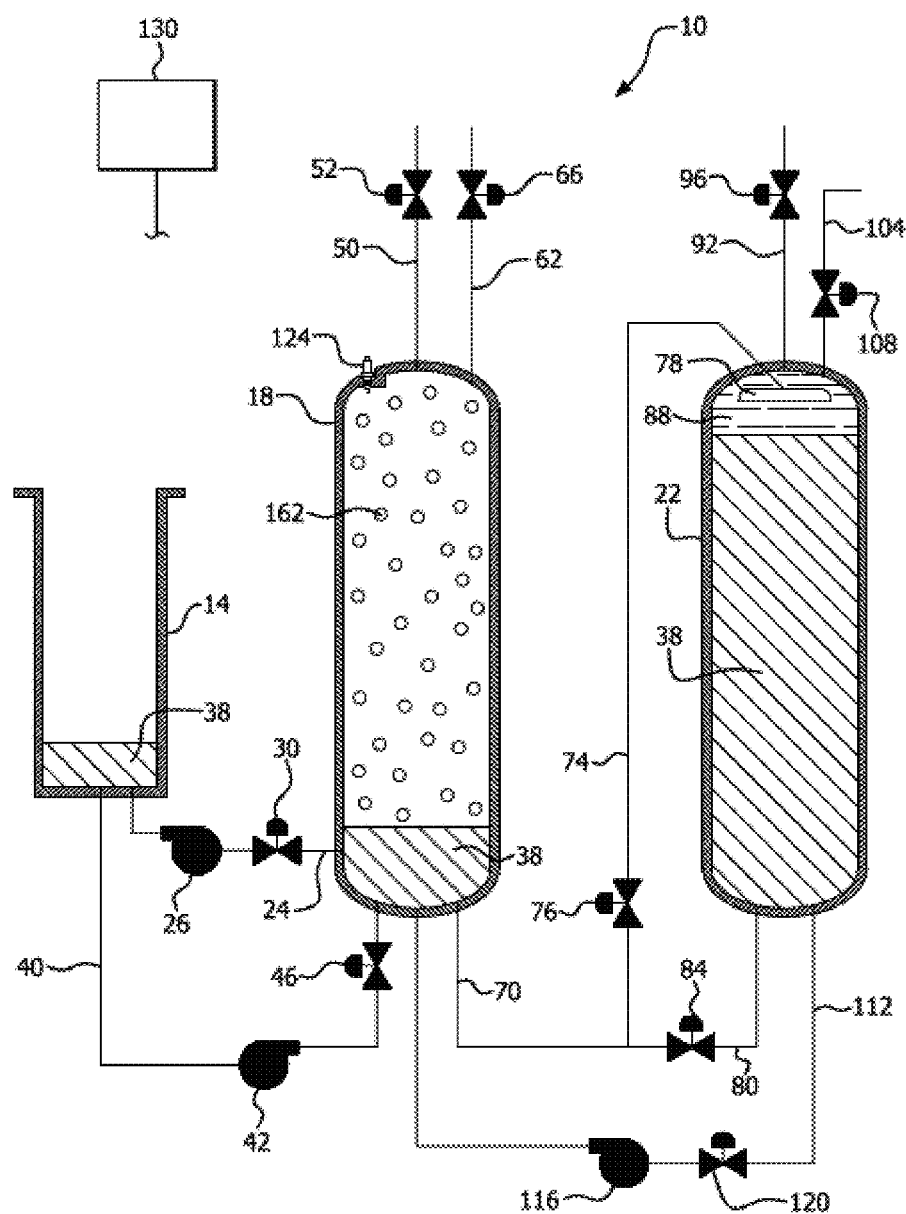
FIG. 6 is a schematic diagram of a gas compressor system according to the invention, in a sixth mode of operation.

The ignition system is then operated to combust the combustible fluid 54, as shown in FIG. 5. The ignition system such as spark generator 124 is signaled by the processor 130 to generate a spark 146 resulting in combustion 150. This combustion creates expanding gases which apply pressure to the compression liquid 38 as indicated by arrow 148. The valve 76 is opened and compression liquid flows through the conduit 74 as indicated by arrow 154. The compression liquid is distributed as spray droplets 156 by spray head 78. The level of compression liquid 38 rises in the compression tank 22 as indicated by arrow 158. Combustion gases 162 will accumulate in the combustion tank 18 as shown in FIG. 6. The compressible gas 88 will be compressed by the rising compression liquid 38 in the compression tank 22, which reduces the volume available to the compressible gas 88. The valve 76 can then be closed as indicated in FIG. 6.

Figure 7:
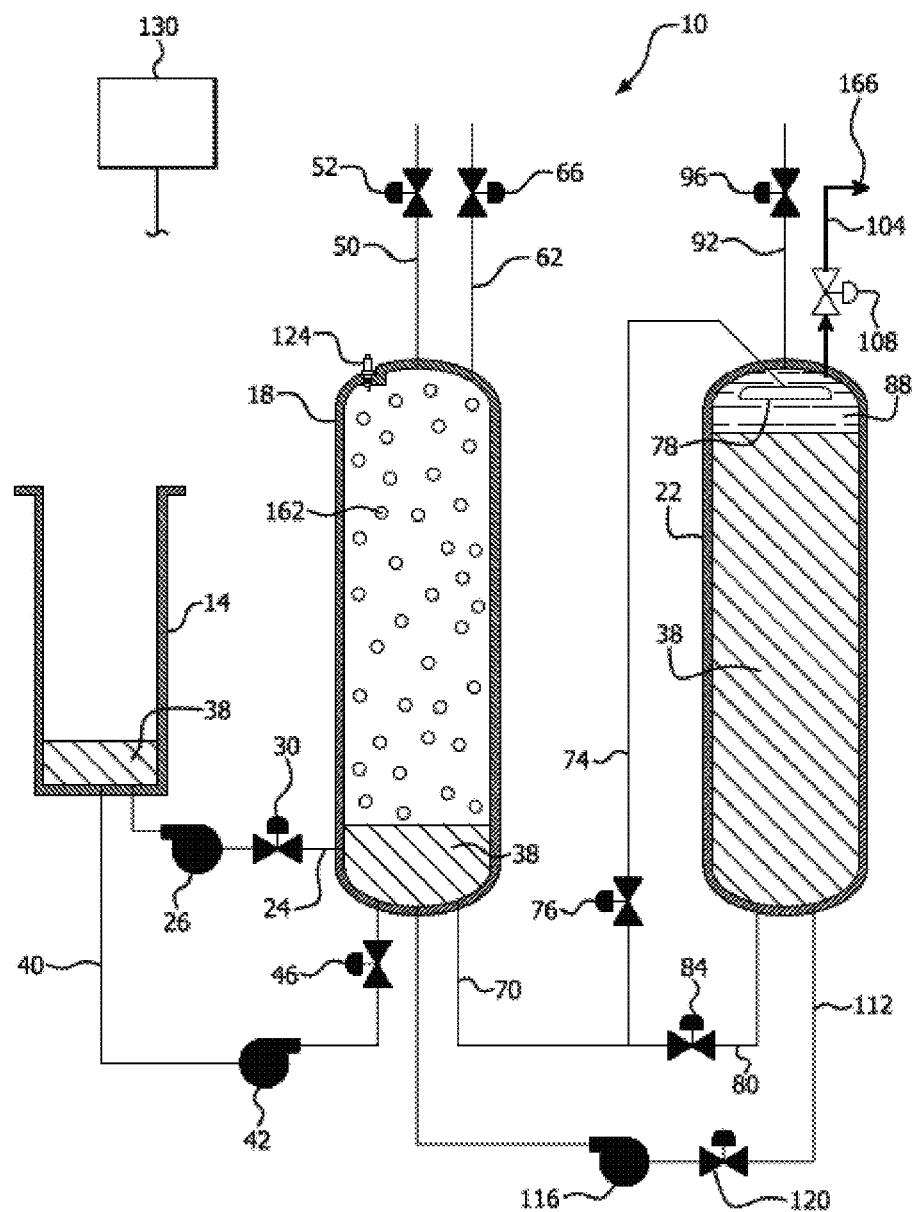
FIG. 7 is a schematic diagram of a gas compressor system according to the invention, in a seventh mode of operation.

System is charged and the compressible gas is in a compressed condition and can be stored in that condition until use of the compressed gas is desired. As shown in FIG. 7, the valve 108 can be opened to release the compressed gas 88 as indicated by arrow 166. The released compressible gas 88 can be a refrigerant for an HVAC&R system, a stored energy source for energy generation as by flow through a turbine, a compressed gas for a chemical or manufacturing process, or other suitable use. The valve 108 can be a pressure regulating valve, such that once high pressure is reached, the pressure-regulating valve begins to release the refrigerant.

Figure 8:
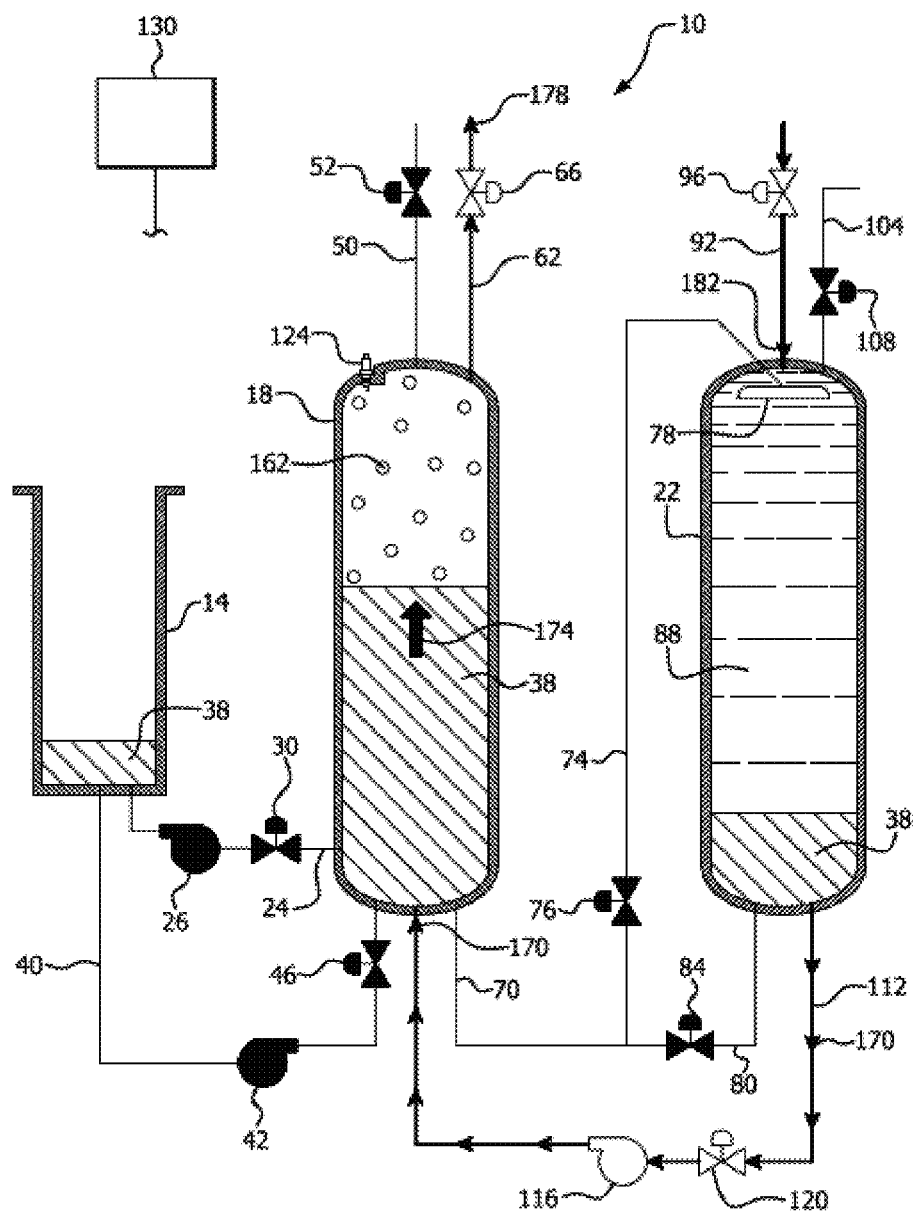
FIG. 8 is a schematic diagram of a gas compressor system according to the invention, in an eighth mode of operation.

The gas compressor system 10 is cycled back to the original condition beginning with removal of the compression liquid 38 from the compression tank 22 to the combustion tank 18, as shown by arrows 170 in FIG. 8. The valve 120 is opened and the pump 116 operated to return the compression liquid to the combustion tank 18. The level of the compression liquid will rise as indicated by arrow 174 which will cause the combusted gases 162 to exit through the conduit 62, as indicated by arrow 178. The valve 66 is opened to permit the escape of the combusted gases 162. The small amount of residual compressible gas, for example a refrigerant, left in the compression tank can in some instances boil off and generate enough pressure to push the compression liquid back into the combustion tank, cooling the walls and releasing the exhaust gases to the atmosphere.

Figure 9:
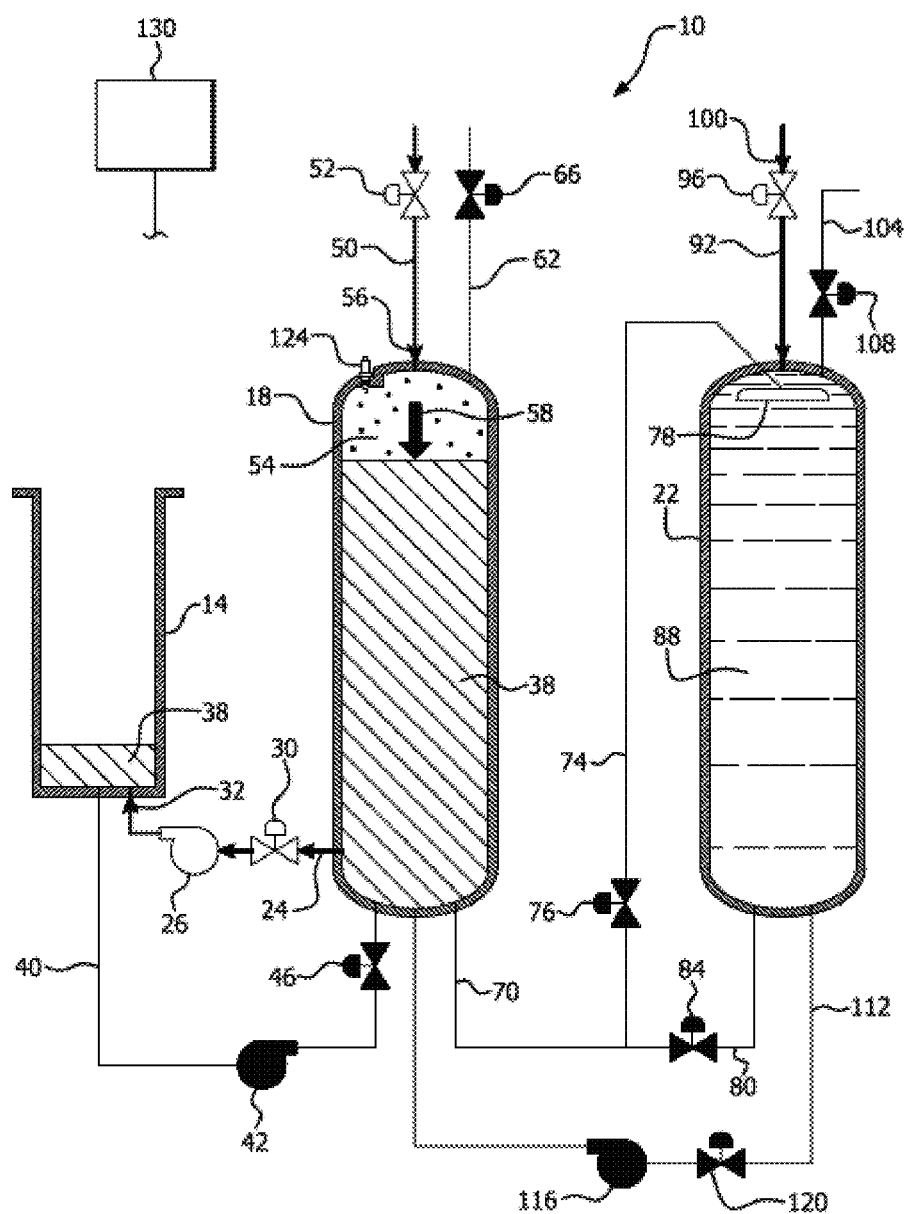
FIG. 9 is a schematic diagram of a gas compressor system according to the invention, in a ninth mode of operation.

The valve 66 is closed when the combusted the gases 162 have exited the combustion tank 18, as shown in FIG. 9. The valve 52 is opened, and a new charge of combustible fluids again flows through the conduit 50. The valve 30 is opened and the pump 26 operated to return the compressor or liquid to the compression liquid holding tank 14. The system is then primed to repeat another cycle.

Figure 10:
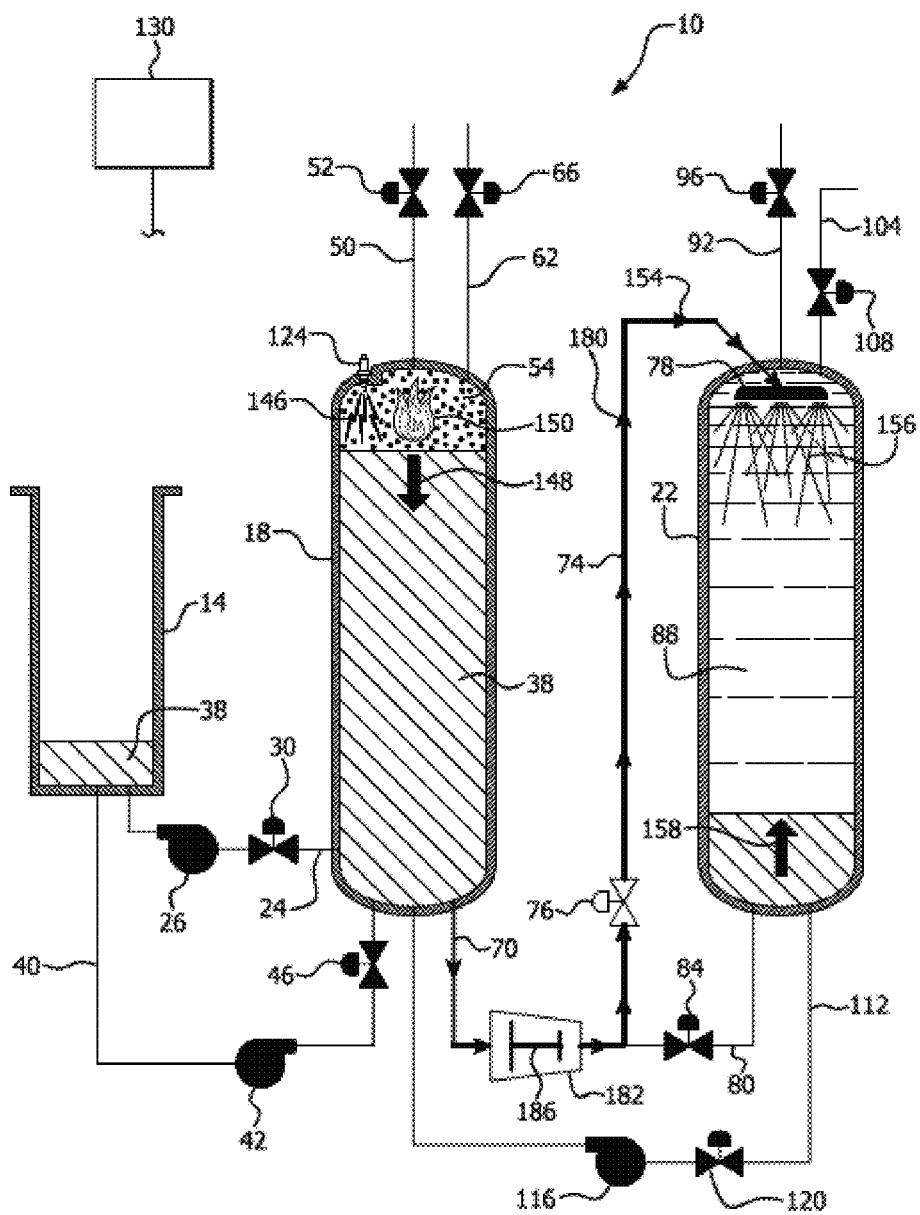
FIG. 10 is a schematic diagram of a gas compressor system of the invention with a hydraulic pressure intensifier.

The pressure of the compression liquid 38 entering the compression tank 22 can be increased by the operation of a suitable pump. Alternatively, a pressure increasing device 182 such as a hydraulic pressure intensifier 186 can be utilized, as shown in FIG. 10. The hydraulic pressure intensifier 186 acts to increase the pressure of the flowing compression liquid 38 by a reduction in the flow volume of the compression liquid 38 leaving the pressure increasing device 182 as compared to the flow volume entering the device. Other pressure increasing devices are possible.

Figure 11:
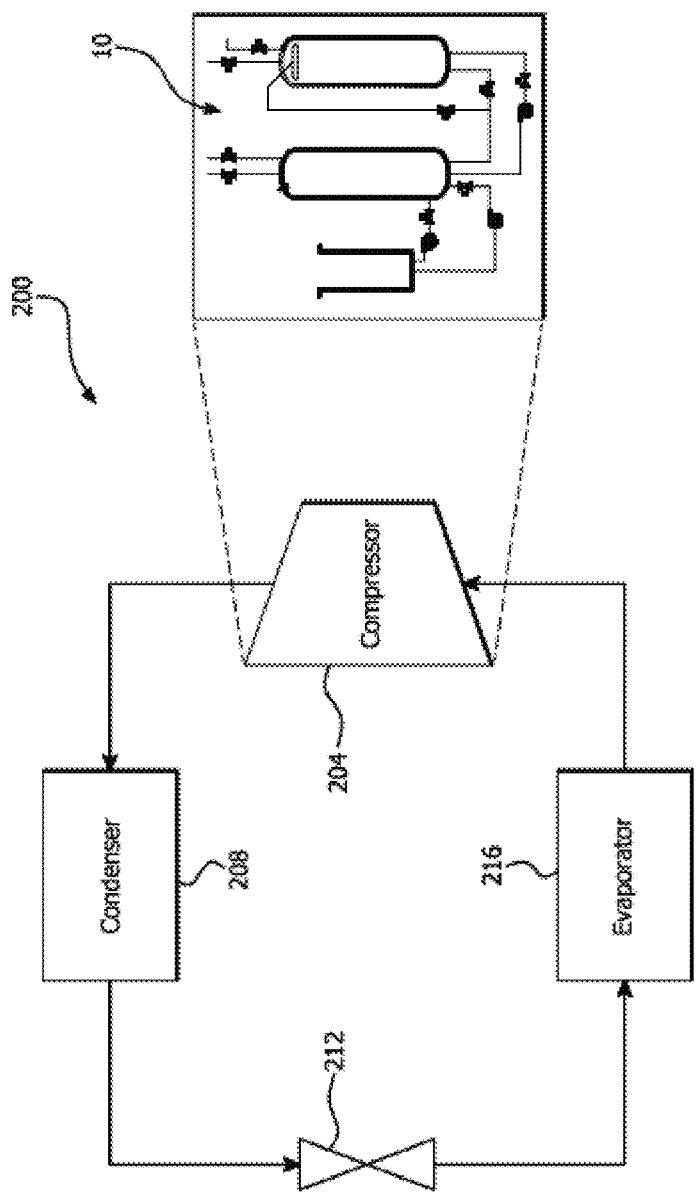
FIG. 11 is a schematic diagram of an HVAC system according to the invention.

The gas compressor system of the invention can be used as part of an HVAC&R system. There is shown in FIG. 11 an HVAC&R system 200 with a compressor 204 including the gas compressor system 10 of the invention. The HVAC&R system 200 further includes other HVAC&R components such as condenser or gas cooler 208, expansion device 212, and evaporator 216. FIG. 11 is a schematic of the gas compressor system of the invention with other main associated components. Most compressor applications have a maximum pressure range of up to 100 bar, but other applications, including hydrogen compression, may require compression to pressures as high as 900 bars. As the level rises, gas is compressed to high pressure; sprayed liquid keeps the compression process near isothermal. An additional feature added to the proposed technology is the hydraulic pressure intensifier which boosts the pressure provided from the stroke in the combustion tank to provide the higher pressure needed.

The invention has many possible applications across a wide range of energy systems and devices, including vapor-compression heating/cooling, industrial compressed gas distribution, $CO_2$ compression/storage, hydrogen compression/storage, and others. The invention enables a step reduction in gas/refrigerant compression primary energy consumption through site utilization of NG, reducing the number of energy conversion steps by half and achieving (near) isothermal compression. Additional benefits include decoupling of heating, ventilation, air-conditioning and refrigeration (HVAC&R) and cooling system loads from the grid and simpler geometric compressor designs. The invention also can provide adjustable compression ratio capabilities that make one compressor compatible with all refrigerants and applications and maintains high compression efficiency during part-load operation. The system can be modular, and parallel or series combinations of the gas compressor system of the invention can be utilized to provide a more continuous source of the compressed compressible gas. In series, the invention can act as a multistage compressor for extremely high-pressure applications such as hydrogen gas compression.

Sprayed droplets with broad range of diameter sizes of 10 to 2500 micrometers can be employed. More specifically, the droplet size that is most beneficial to this technology range is 300 to 900 micrometers and the most optimal range is 400 to 700 micrometers. The droplet size can be 300, 325, 350, 375, 400, 425, 450, 475, 500, 525, 550, 575, 600, 625, 650, 675, 700, 725, 750, 775, 800, 825, 850, 875, and 900 micrometers, or within a range of any high value and low value selected from these values. In HVAC&R applications, scroll-type compressors are typically the compressors of choice and are limited to maximum efficiencies of around 65%. In hydrogen compression, compressor efficiencies are stated to currently be around 65-70%, with a goal of reaching 80%. The invention combines the gas compressor technology which enables site utilization of NG to drive compression, thereby improving efficiency by reducing the number of energy conversion steps needed and bringing the primary energy source to the end use, and utilizes liquid piston compression combined with advanced heat exchange via micron-sized sprayed droplets to achieve near isothermal compression, which is an energy-efficient, thermodynamically ideal compression trajectory.

Figure 12:
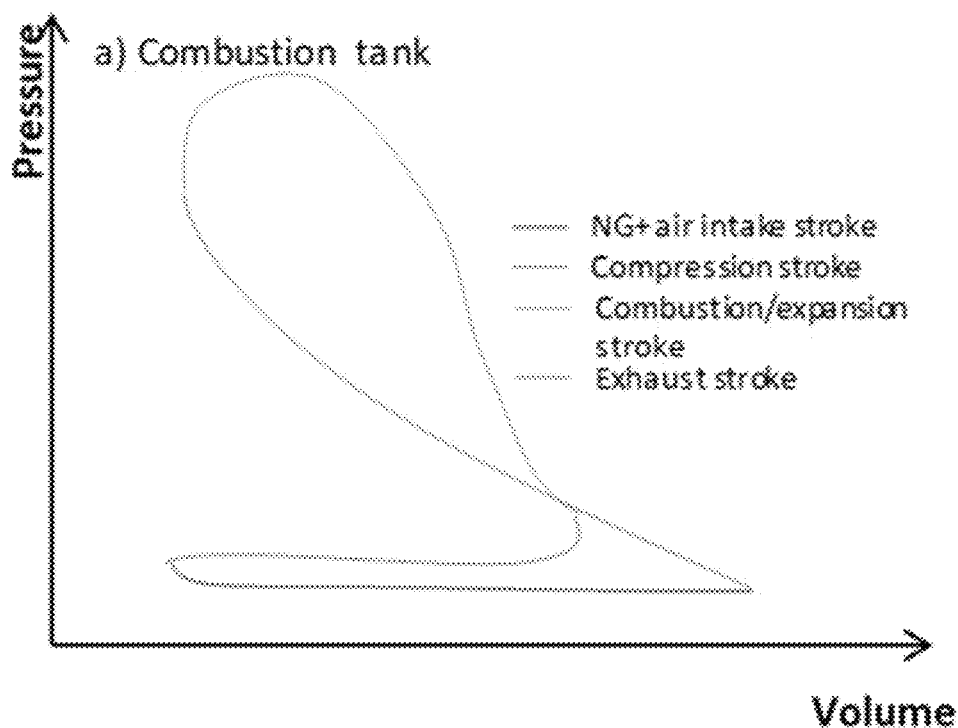
FIG. 12 is a pressure volume diagram of the gas in the combustion tank during a cycle.
Figure 13:
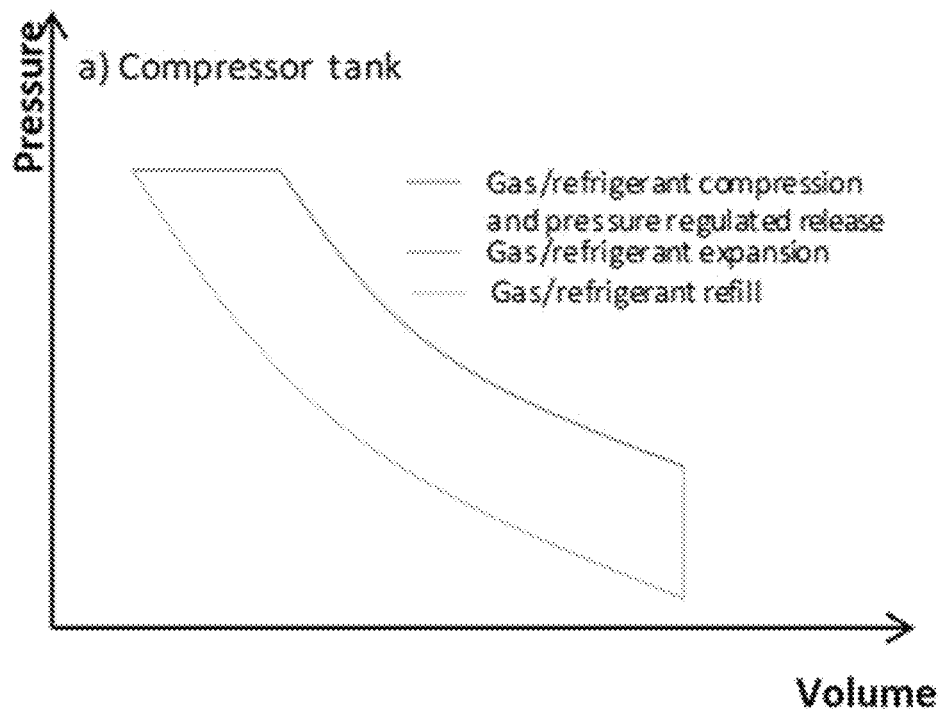
FIG. 13 is a pressure-volume diagram of the gas in the compression tank during a cycle.
Figure 14:
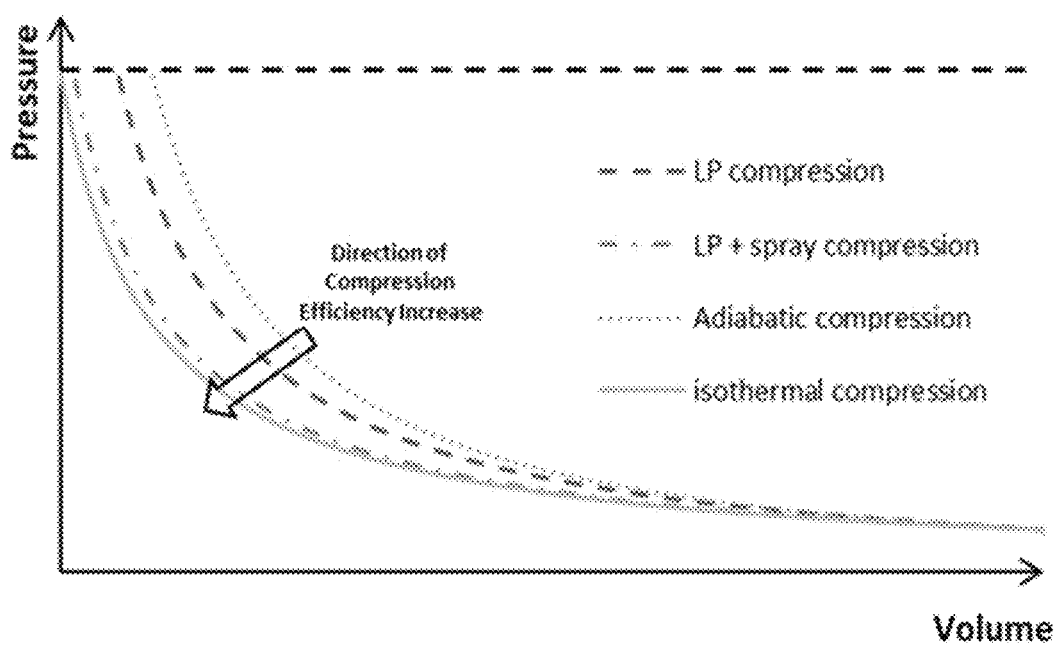
FIG. 14 is a pressure-volume diagram of compression trajectories in various compression modalities.

Compared with adiabatic compression—the state-of-the-art compression trajectory for existing compressor technologies—isothermal compression has the potential to save 10-24% of specific energy consumption. This is shown in FIG. 12 and FIG. 13, which show the associated pressure-volume diagrams and related processes for the combustion tank and compression tank, respectively, with advanced heat exchange via sprayed droplets to achieve (near) isothermal compression. FIG. 14 shows a pressure-volume diagram comparing multiple compression trajectories including adiabatic, isothermal, liquid piston, and liquid piston+sprayed droplets. As shown, the latter two trajectories require less work (area under the curve) to achieve the same compression. These improved compression trajectories have already been achieved for air compression.

Table 1 presents a comparison between the proposed compressor and the state of the art. Note that the primary fuel to compression efficiency in the state of the art electric scroll compressors is approximately $\eta \sim 17$-26% (i.e., natural gas→shaft power in power plants ($\eta_1 \sim 55\%$)→electricity ($\eta_2 \sim 97\%$)→electricity transmission/distribution ($\eta_3 \sim 85\%$)→motor ($\eta_4 \sim 55$-90%)→scroll compressor ($\eta_5 \sim 65\%$)). By eliminating the above conversion losses and introducing a direct conversion of natural gas combustion pressure to refrigerant (or gas) compression, the primary fuel to compression efficiency of the proposed technology is calculated to be 55%.

TABLE 1

Comparison of NG compressor to state of the art

|  | Proposed NG compressor | State-of-the-art scroll compressor |
| --- | --- | --- |
| Efficiency (primary fuel to compression) | ~55% | ~17-26% |
| Variable stroke/compression ratio | YES | NO |

TABLE 1-continued

Comparison of NG compressor to state of the art

|  | Proposed NG compressor | State-of-the-art scroll compressor |
| --- | --- | --- |
| No. of energy conversion steps (primary fuel to compression) | 1 | 5 |

The invention could provide annual energy savings of up to 10,000 TBTU primary energy with at-scale deployment across most/all compressor applications. Compressed air systems account for 10% of all electricity and 16% of all motor system energy use by US manufacturers, or approximately 91,000 GWh/year. The use of the gas compressor system of the invention at scale in industrial compressed air systems could result in savings of 9,105-21,852 GWh (31-75 TBTU) per year. The invention has the potential to decouple several energy systems loads such as HVAC, compressed air, $CO_2$ compression, and hydrogen compression from the electrical grid, which is already overstrained, by burning natural gas locally to drive compression. The gas compressor of the invention is less complex than state-of-the-art compressor designs in an engineering sense, leading to simpler geometries and streamlined, cheaper manufacturing processes. In addition, the gas compressor system of the invention can reduce overall primary energy use by enabling site utilization of abundant natural gas, avoiding significant energy losses incurred through the many energy conversion steps needed to convert primary energy to the electricity required to power state-of-the-art compressors. This can double the primary fuel to compression efficiency and can significantly benefit vapor compression technology.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A gas compressor system, comprising:
    a compression liquid holding tank;
    a combustion tank having a compression liquid inlet in fluid communication with the compression liquid holding tank, a combustible fluid inlet for fluid communication with a combustible fluid source, an ignition system for igniting the combustible fluid, and a compression liquid flow opening;
    a compression liquid;
    a pump for pumping the compression liquid from the compression liquid holding tank to the combustion tank;
    a compression tank having a compression liquid flow opening, the compression liquid flow opening of the compression tank being in liquid communication with the compression liquid flow opening of the combustion tank;

a valve for controlling flow of the compression liquid between the compression liquid holding tank and the combustion tank;

a valve for controlling fluid communication between the combustion tank and the compression tank;

a valve for controlling the flow of combustible fluid to the combustion tank;

a compressible gas, wherein the combustible fluid is flowed into the combustion tank and the compressible gas is provided in the compression tank, the compression liquid is pumped by the pump from the compression liquid holding tank to the combustion tank, compressing the combustible fluid, the combustible fluid is ignited by the ignition system causing the compression liquid to flow from the combustion tank to the compression tank, compressing the compressible gas in the compression tank; and a hydraulic pressure intensifier to increase a pressure of the compression liquid flowing from the combustion tank to the compression tank.

2. The gas compressor system of claim 1, wherein the compressing of the compressible gas is isothermal or near isothermal.

3. The gas compressor system of claim 1, wherein the compression tank comprises at least one selected from the group consisting of a compressible gas inlet and a compressible gas outlet.

4. The gas compressor system of claim 3, wherein the compression tank comprises a valve for controlling the flow of the compressible gas.

5. The gas compressor of claim 1, further comprising a spray head for introducing compression liquid into the compression tank as a spray.

6. The gas compressor of claim 1, wherein the combustible fluid comprises at least one selected from the group consisting of natural gas, gasoline, and diesel fuel.

7. The gas compressor of claim 1, wherein the ignition system comprises a spark generator.

8. The gas compressor of claim 1, wherein the compressible gas comprises at least one selected from the group consisting of air, hydrogen, $CO_2$, natural gas, hydrocarbon gases, and refrigerant gases.

9. A refrigeration or heat pump system, comprising:
a gas compressor system, comprising:
a compression liquid holding tank;
a combustion tank having a compression liquid inlet in fluid communication with the compression liquid holding tank, a combustible fluid inlet for fluid communication with a combustible fluid source, an ignition system for igniting the combustible fluid, and a compression liquid flow opening;
a compression liquid;
a pump for pumping the compression liquid from the compression liquid holding tank to the combustion tank;
a compression tank having a compression liquid flow opening, the compression liquid flow opening of the compression tank being in liquid communication with the compression liquid flow opening of the combustion tank;
a valve for controlling fluid communication between the combustion tank and the compression tank;
a valve for controlling the flow of combustible fluid to the combustion tank;
a compressible gas, wherein the combustible fluid is flowed into the combustion tank and the compressible gas is provided in the compression tank, the compression liquid is pumped by the pump from the compression liquid holding tank to the combustion tank, compressing the combustible fluid, the combustible fluid is ignited by the ignition system causing the compression liquid to flow from the combustion tank to the compression tank, compressing the compressible gas in the compression tank;

a hydraulic pressure intensifier to increase a pressure of the compression liquid from the combustion tank to the compression tank;

a condenser or gas cooler;

an expansion device; and an evaporator.

10. The refrigeration or heat pump system of claim 9, wherein the combustible fluid comprises at least one selected from the group consisting of natural gas, gasoline and diesel fuel.

11. The refrigeration or heat pump system of claim 9, wherein the ignition system comprises a spark generator.

12. The refrigeration or heat pump system of claim 9, wherein the compressing of the compressible gas is isothermal or near isothermal.

13. A method for compressing a gas, comprising the steps of:
providing a compression liquid holding tank,
providing a combustion tank having a compression liquid inlet in fluid communication with the compression liquid holding tank, a combustion gas inlet for communicating with a combustion gas source, and a compression liquid outlet;
providing a compression liquid in the compression liquid holding tank;
providing a compression tank having a compression liquid flow opening, the compression liquid flow opening of the compression tank being in liquid communication with the compression liquid flow opening of the combustion tank;
providing a compressible gas in the compression tank;
flowing a combustible fluid into the combustion tank;
pumping the compression liquid from the compression liquid holding tank to the combustion tank, compressing the combustion gas;
combusting the combustible fluid causing the compression liquid to flow from the combustion tank to the compression tank, compressing the compressible gas in the compression tank, so the compressed compressible gas causes the compression liquid to flow to the combustion tank to displace and remove combustion gases from the combustion tank; and
utilizing a hydraulic pressure intensifier to increase a pressure of the compression liquid from the combustion tank to the compression tank.

14. The method of claim 13, wherein the compression of the compressible gas is isothermal or near isothermal.

15. The method of claim 13, wherein the combustible fluid is natural gas.

16. A gas compressor, comprising;
a compression liquid holding tank;
a combustion tank having a compression liquid inlet in fluid communication with the compression liquid holding tank, a combustible fluid inlet for fluid communication with a combustible fluid source, an ignition system for igniting the combustible fluid, and a compression liquid flow opening;
a compression liquid;

a pump for pumping the compression liquid from the compression liquid holding tank to the combustion tank;

a compression tank having a compression liquid flow opening, the compression liquid flow opening of the compression tank being in liquid communication with the compression liquid flow opening of the combustion tank;

a valve for controlling fluid communication between the combustion tank and the compression tank;

a valve for controlling the flow of combustible fluid to the combustion tank, wherein the combustible fluid is flowed into the combustion tank and compressible gas is provided in the compression tank, the compression liquid is pumped by the pump from the compression liquid holding tank to the combustion tank, compressing the combustible fluid, the combustible fluid is ignited by the ignition system causing the compression liquid to flow from the combustion tank to the compression tank, compressing the compressible gas in the compression tank; and a hydraulic pressure intensifier to increase a pressure of the compression liquid flowing from the combustion tank to the compression tank.

17. The gas compressor of claim 16, wherein the compressing of the compressible gas is isothermal or near isothermal.

* * * * *